July 12, 1932.  J. B. WISNER  1,867,430
LOCKABLE JOINT FOR HOSE SECTIONS
Filed Oct. 3, 1931
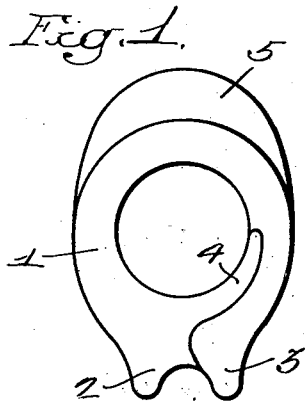
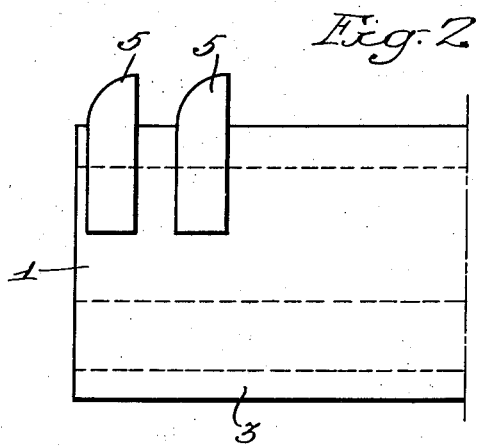
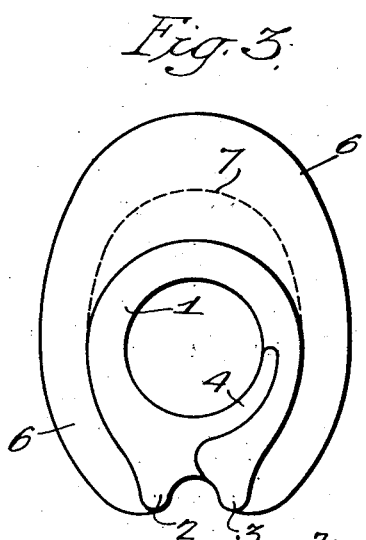
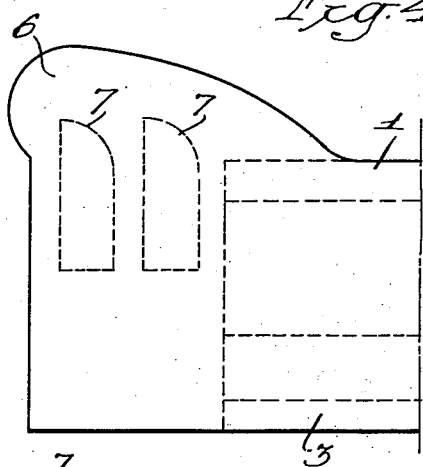
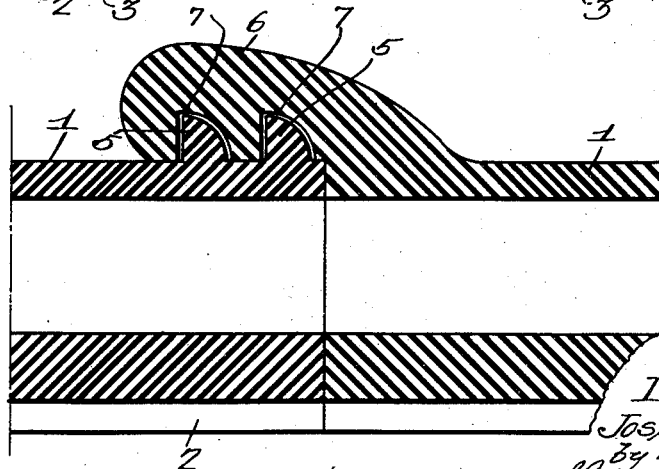
Inventor:
Josiah B. Wisner
by his Attorneys
Howson & Howson Patented July 12, 1932

1,867,430

UNITED STATES PATENT OFFICE

JOSIAH B. WISNER, OF CAMDEN, NEW JERSEY

LOCKABLE JOINT FOR HOSE SECTIONS

Application filed October 3, 1931. Serial No. 566,719.

This invention relates to lockable joints for flexible hose or sleeve sections. While the proposed joint construction of the invention is particularly adapted to protective insulating sleeves for enclosing electrical conductors so as to protect linemen and others from shock, it is applicable also to any flexible hose or sleeve sections which it is desired to couple together.

An object of the invention is to provide a simple and economically manufacturable joint construction which is formed integrally with the hose or sleeve sections to be coupled together and requires no additional fastening means.

A further object of the invention is to provide a simple joint construction which is highly efficient in carrying out the desired object, viz., quick and effective detachable coupling of hose sections.

These and other objects will be apparent hereinafter. The accompanying drawing illustrates the invention fully and reference may be had thereto in connection with the following detailed description for a complete understanding of the invention.

In the drawing:

Fig. 1 is an end view of one of the hose or sleeve sections to be coupled together;

Fig. 2 is a partial side view of the hose section of Fig. 1;

Fig. 3 is an end view of the other of the hose or sleeve sections to be coupled together;

Fig. 4 is a partial side view of the hose section of Fig. 3; and

Fig. 5 is a partial sectional assembly view of the coupled hose sections illustrating clearly the manner in which the joint lockably secures the sections together.

While, as previously stated, the invention is applicable to any flexible hose or sleeve sections, I propose to use it in connection with the form of insulating protective sleeve illustrated in the drawing. This particular sleeve is in common use by linemen and others working on or near electrical conductors carrying currents. In practically all cases, it is necessary to use two or more sections of protective sleeving, and it has heretofore been common practice to secure such sections together and insulate the electrical conductor at the juncture thereof by means of insulating tape which is simply wound around the abutting ends of the sleeve sections. Obviously, this is not only cumbersome and requires considerable time but is also dangerous since it is impossible to insure proper attachment of the sleeve sections and also adequate protection against shock at their juncture. The present invention eliminates entirely this or any similar practice and affords a quick attachable and detachable joint for the sleeve sections and at the same time adequate protection against shock.

Reference to Figs. 1 and 3 will afford a clear understanding of the construction of the insulating protective sleeves now in common use as mentioned above. These sleeves 1 are slit longitudinally, the severed edges thereof being indicated generally by reference characters 2 and 3. A longitudinal lip 4 is formed on one of the severed edges and arranged to overlap the other of the severed edges. The latter edge is recessed so as to seat lip 4 nicely and provide an internal smooth surface on the sleeve. Sleeve sections constructed in this manner are readily attachable to an electrical conductor by merely forcing them against the conductor at the severed edge and thus causing them to snap open and allow the conductor to position itself within the sleeve.

In accordance with the present invention as applied to protective sleeve sections of the form illustrated, I provide near an end of one of the sections one or more integral lugs 5, in the present instance two such lugs being shown. These lugs are preferably shaped as illustrated in Figs. 1 and 2, and it will be apparent that they extend substantially halfway around the circumference of the section. The edge of each of the lugs is preferably formed, as illustrated in Fig. 2, for a purpose which will be clearly apparent hereinafter. On an end of the hose or sleeve section which is to be coupled or attached to the section just described, I provide an integral protruding enclosure 6, shown clearly in Figs. 3 and 4. This enclosure extends substantially around the periphery or circumference of the sleeve section, extending from one of the severed edges thereof to the other severed edge (see Fig. 3). It protrudes considerably beyond the end of the sleeve section, as illustrated in Fig. 4, and has formed in the internal surface thereof recesses 7 which are shaped to receive lugs 5 of the adjacent section at the same time that the enclosure receives the end of such section. The part of the protruding enclosure which is diametrically opposite the open slit thereof is of greater thickness than the remainder thereof to allow for recesses 7. The enclosure is formed with a relatively thick wall to lend rigidity and firmness to the joint structure. The lugs and protruding enclosure may be formed on the sections at the same time that the sections are formed. While it would be preferable to make all sections alike with lugs on one end and the protruding enclosure on the other, they may be formed in any desired manner giving the lockable joints at their junctures.

In Fig. 5, the manner in which the sleeve sections, formed as described above, are lockably attached is clearly illustrated. In attaching the sections, it is merely necessary to place them adjacent each other and then slidably snap them into end to end abutting relation. At such time, the protruding enclosure 6 of one section will interlock by virtue of its recesses 7 with lugs 5. The reason for having the recesses and lugs shaped as illustrated will now be apparent since the rounded surface enables the ready coupling of the sections in the manner described above. When firmly interlocked, the sections cannot separate until they are forcibly separated by the person using them. It will be apparent from Fig. 5 that the joint construction affords secure attachment of the sections and, at the same time, complete protection against shock. Since enclosure 6 extends around the juncture of the sleeve sections and completely covers such juncture, there is no possibility of shock to the lineman or other person from an exposed portion of the conductor.

While I have illustrated my invention herein in one particular form and as applied to a particular form of hose or sleeve, it will be apparent that it may take modified forms and it is applicable to other forms of sleeves. It is to be understood, therefore, that only such limitations contained in the appended claims are to be imposed upon the invention.

I claim:

1. A lockable joint for hose or sleeve sections, comprising at least one integral lug extending circumferentially halfway about an end of one of the sections to be coupled together, said lug having a curved surface and a flat surface intersecting therewith to form a sharp ridge, and an integral protruding enclosure on an end of the other of the sections to be coupled together, said enclosure receiving said first-mentioned end and having a recess shaped similarly to said lug to lockably receive said lug when said sections are placed in end to end abutting relation.

2. A lockable joint for longitudinally split hose or sleeve sections, comprising at least one integral lug on an end of one of the sections to be coupled together, and an integral longitudinally protruding enclosure on an end of the other of the sections to be coupled together, said enclosure extending circumferentially between the severed edges of said other section and being recessed so as to enclosably receive said first-mentioned end and lockably receive said lug when said sections are placed in end to end abutting relation.

3. A lockable joint for longitudinally split hose or sleeve sections, comprising at least one integral semi-circumferential lug on an end of one of the sections to be coupled together, and an integral longitudinally protruding enclosure on an end of the other of the sections to be coupled together, said enclosure extending circumferentially between the severed edges of said other section and being recessed so as to enclosably receive said first-mentioned end and lockably receive said lug when said sections are placed in end to end abutting relation.

4. A lockable joint for longitudinally split hose or sleeve sections, comprising at least one integral lug on an end of one of the sections to be coupled together diametrically opposite the severed edges thereof, and an integral longitudinally protruding enclosure on an end of the other of the sections to be coupled together, said enclosure extending circumferentially between the severed edges of said other section and being recessed so as to enclosably receive said first-mentioned end and lockably receive said lug when said sections are placed in end to end abutting relation.

5. A lockable joint for longitudinally split hose or sleeve sections, comprising at least one integral semi-circumferential lug on an end of one of the sections to be coupled together diametrically opposite the severed edges thereof, and an integral longitudinally protruding enclosure on an end of the other of the sections to be coupled together, said enclosure extending circumferentially between the severed edges of said other section and being recessed so as to enclosably receive said first-mentioned end and lockably receive said lug when said sections are placed in end to end abutting relation.

JOSIAH B. WISNER.